(12) United States Patent
Kent

(10) Patent No.: US 8,360,407 B2
(45) Date of Patent: Jan. 29, 2013

(54) CUTTING BOARD WITH SCRAP BIN

(75) Inventor: Joseph Kent, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 42 days.

(21) Appl. No.: 13/047,571

(22) Filed: Mar. 14, 2011

(65) Prior Publication Data

US 2011/0221112 A1 Sep. 15, 2011

Related U.S. Application Data

(60) Provisional application No. 61/313,587, filed on Mar. 12, 2010.

(51) Int. Cl.
*B23Q 3/00* (2006.01)

(52) U.S. Cl. .......... 269/15; 269/302.1; 269/289 R; 269/303; 269/308

(58) Field of Classification Search .......... 269/302.1, 269/289 R, 303, 308
See application file for complete search history.

(56) References Cited

U.S. PATENT DOCUMENTS

| | | | |
|---|---|---|---|
| 2,609,024 A | 9/1952 | Russ | |
| 3,708,086 A | 1/1973 | Colato | |
| 3,736,088 A | 5/1973 | Jimenez | |
| 3,797,334 A | 3/1974 | Sinclair | |
| D259,166 S | 5/1981 | Krusche | |
| D281,850 S | 12/1985 | Morin | |
| D287,802 S | 1/1987 | Daenen | |
| 4,759,153 A | 7/1988 | Cohen | |
| 4,907,789 A * | 3/1990 | Tice | 269/13 |
| 5,233,793 A | 8/1993 | Dandurand | |
| D348,374 S | 7/1994 | Dandurand | |
| D352,423 S | 11/1994 | Laib | |
| 5,366,208 A | 11/1994 | Benjamin | |
| 5,527,022 A | 6/1996 | Gibson | |
| D372,176 S | 7/1996 | Meisner | |
| D374,380 S | 10/1996 | Sawatsky | |
| D376,295 S | 12/1996 | Ahern, Jr. et al. | |
| 5,593,062 A | 1/1997 | Martin | |
| D381,564 S | 7/1997 | Kolada | |
| D382,445 S | 8/1997 | Indekeu | |
| D390,072 S | 2/1998 | Miller | |
| D395,985 S | 7/1998 | Krupa et al. | |
| D414,661 S | 10/1999 | Tardif | |
| D416,768 S | 11/1999 | Lisser et al. | |
| 5,984,294 A | 11/1999 | Bogomolny | |
| 5,996,983 A * | 12/1999 | Laurenzi | 269/15 |
| D420,855 S | 2/2000 | Hurley | |
| D424,891 S | 5/2000 | Kaposi | |
| D434,953 S | 12/2000 | Yu | |
| D442,037 S | 5/2001 | Wong | |
| D451,018 S | 11/2001 | Chen et al. | |
| D464,237 S | 10/2002 | Kaposi | |
| D488,603 S | 4/2004 | Bardenhagen-Shuster | |
| D489,579 S | 5/2004 | Wright | |
| D491,024 S | 6/2004 | Welsh | |
| D492,166 S | 6/2004 | Kaposi | |

(Continued)

OTHER PUBLICATIONS

The Wisconsin Cheeseman, Holiday 2003, p. 14, Cheese Logs and Cutting Board.

*Primary Examiner* — Lee D Wilson
*Assistant Examiner* — Nirvana Deonauth
(74) *Attorney, Agent, or Firm* — Lowe Graham Jones PLLC

(57) ABSTRACT

A cutting board with scrap bin includes a generally planar cutting surface that can rest on a countertop to enable cutting. One portion of the cutting board is adapted to attach to a scrap bin, with the scrap bin being selectively attachable or detachable as desired. In some versions the scrap bin is also collapsible, making it smaller for storage.

18 Claims, 3 Drawing Sheets

U.S. PATENT DOCUMENTS

| | | |
|---|---|---|
| D550,044 S | 9/2007 | Curtin et al. |
| D557,085 S | 12/2007 | Shamoon |
| D558,541 S | 1/2008 | Shamoon |
| D563,739 S | 3/2008 | Shamoon |
| D573,419 S | 7/2008 | Kaposi |
| D574,200 S | 8/2008 | Pearl et al. |
| 2002/0195763 A1 | 12/2002 | Benjamin |
| 2005/0080314 A1 | 4/2005 | Terwilliger et al. |
| 2007/0001359 A1 | 1/2007 | Pearl et al. |

* cited by examiner

CUTTING BOARD WITH SCRAP BIN

PRIORITY CLAIM

This application claims the benefit of U.S. Provisional Application Ser. No. 61/313,587 filed Mar. 12, 2010; the contents of which are incorporated by reference.

FIELD OF THE INVENTION

This invention relates generally to cutting boards, particularly including cutting boards having an attached bin for retaining scraps produced while cutting.

BACKGROUND OF THE INVENTION

In food preparation, it is often useful to have a cutting board that can be placed on any countertop in order to cut the food items at any desired location without damaging the countertop. The cutting process often separates peels, stems, leaves, cores, or other food scraps that are to be discarded. Because it can be inconvenient to carry the scraps back and forth to a discard container contemporaneously as they are produced, it is useful to have a scrap bin associated with the cutting board. Unfortunately, a cutting board with an attached scrap bin is typically bulky and difficult to store.

SUMMARY OF THE INVENTION

A preferred version of the invention includes a cutting board that is configured for use in cutting food items. The cutting board has a generally planar region that can rest on a countertop to enable cutting.

One portion of the cutting board is adapted to attach to a scrap bin, with the scrap bin being selectively attachable or detachable as desired.

In preferred versions the scrap bin is also collapsible, making it even smaller for storage.

These and other examples of the invention will be described in further detail below.

BRIEF DESCRIPTION OF THE DRAWINGS

The preferred versions of the invention are described below and illustrated in the following figures.

DETAILED DESCRIPTION OF THE PREFERRED EMBODIMENT

Figure 1:
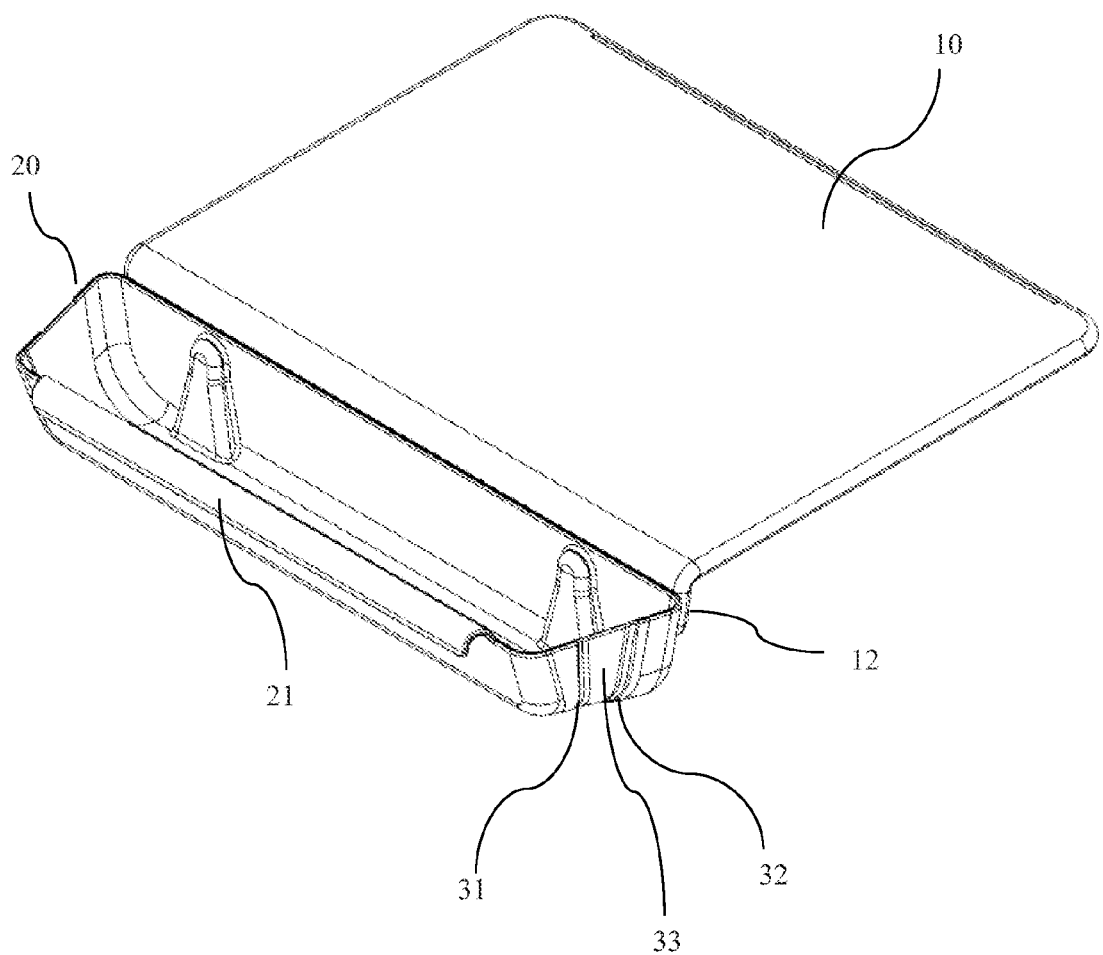
FIG. 1 is a perspective view of a preferred version of a cutting board with scrap bin.
Figure 2:
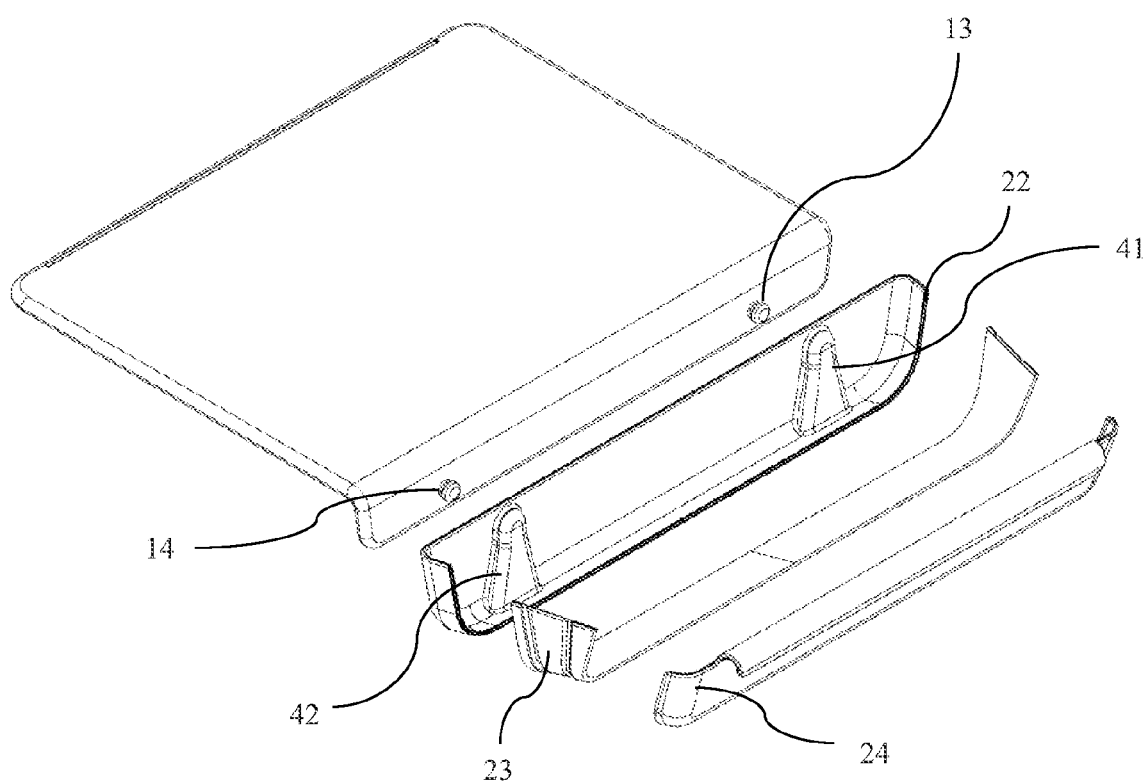
FIG. 2 is an exploded view of a preferred version of a cutting board with scrap bin.

With reference to FIGS. 1-4, the exemplary cutting board includes a planar cutting surface 10. The substantially planar cutting surface is configured to rest on a countertop to provide a surface suitable for cutting foods. The cutting board may be formed from any suitable materials, for example, wood or plastics such as polyethylene. The upper surface of the cutting board should be relatively smooth and planar, while the lower surface should be configured to rest on a horizontal surface such as a countertop. The lower surface may optionally include a layer of resilient material such as a thermoplastic elastomer, or feet made from such a material, to prevent the cutting board from sliding on the countertop.

One portion of the cutting board is configured to attach to a scrap bin. In the version as shown, this is accomplished by providing mounts on a front end of the cutting board. Thus, a front end of the cutting board includes a vertical face 12 that is generally perpendicular to the upper planar surface 10 of the cutting board. Most preferably, the vertical face extends downwardly from the planar cutting board, thereby forming an L shape. The downwardly-depending vertical face can engage an edge of the countertop on which the cutting board rests to ensure that the cutting board is firmly placed along the edge of the countertop.

In the version as shown, the vertical face extends substantially along an entire side of the cutting board, while in other versions of the invention it may extend downward along only a portion of a side. Likewise, in some versions of the invention the downwardly-extending vertical face may be omitted, with a means for mounting the scrap bin being incorporated into an end of the cutting board without a vertical extension.

The cutting board includes one or more scrap bin supports 13, 14 for mounting the scrap bin. In the exemplary version, the supports are in the form of horizontal pins having peripheral flanges to define an annular shoulder to retain the scrap bin as described below.

The scrap bin 20 is constructed to be collapsible and is formed in three sections, including a rigid back section 22, a flexible central section 23, and a rigid front section 24. The rigid back section includes a generally flat back wall that is configured to rest against the generally flat downwardly-depending vertical face of the cutting board. In other versions the front and back sections may also be flexible or semi-rigid.

The back section further includes a means for attachment to the cutting board. In the illustrated version, this is in the form of one or more indentations 41, 42 defining cavities on the back side of the back section 22 and formed to receive the supports 13, 14 extending from the cutting board. The cavities extend inward in a direction from the back section toward the front section when the scrap bin is assembled. A lower portion of the cavity is flared outwardly from side to side, creating a wide skirt that will easily allow the supports to be received within the lower portion of the cavity. An upper portion of the cavity is substantially narrower, having a rounded upper end and a neck formed just below the upper end.

The cavities preferably further include a slot formed in the upper portion of the cavity, the slot being sized to retain the pin of the support but being narrower than the annular flange of the support. The slots thereby provide a shoulder against which the annular flanges will engage to prevent the scrap bin from falling from the cutting board. Accordingly, the bin supports are readily insertable into the lower portion of the cavities. Once inserted into the lower portion of the cavity, the back section is moved downward relative to the cutting board, urging the support upward and into the top portion of the cavity where it is frictionally held in place.

Other attachment means may be used to secure the scrap bin to the cutting board. For example, the scrap bin may have one or more pins or hooks that are insertable into slots formed in the cutting board. Alternatively, tongue and groove, snaps, or other interlocking arrangements may be used.

The center section 23 of the scrap bin is attached to the front and back sections by gluing, over-molding, or other suitable techniques. As shown, the center section includes a pair of living hinges 31, 32 with an intermediate region 33 between them. The central section is preferably formed from silicone or other resilient materials such that the living hinges enable the central section to be folded along the living hinges.

Because the living hinges extend generally along the entire length of the central section of the scrap bin, they allow the entirety of the scrap bin to be compressed along the living hinge.

The front section 24 of the scrap bin is also formed from a substantially rigid material such as plastic. The front section 24 has a width that is smaller than the width of the back side, such that the intermediate section is tapered somewhat to define a bin that is substantially trapezoidal in shape when viewed from the top, looking downward upon the planar surface 10 and the bin 20.

Optionally the front section may include a handle 21 to facilitate pulling the scrap bin outward to expand it from the collapsed position. In the illustrated version, the handle is in the form of a curved flange sized to receive the fingertips of a user so that it can be pulled outward.

In use, the cutting board may be placed on a countertop with the vertical edge 12 being adjacent the edge of the countertop. The scrap bin is attached to the cutting board, mounting the receiving cavities onto the supports. If the scrap bin is in the compressed position, it can be expanded by pulling the handle outwardly.

After use, the scrap bin can be separated from the cutting board, emptied, cleaned, and compressed for storage. By pushing the front section 24 toward the back section 22, the front section 24 of the scrap bin is urged into a position inside the central section. The width of the front section 24 is somewhat smaller than the width of the back section 22. Consequently, the movement of the front section toward the back section causes the first living hinge 31 to fold such that an outer lateral surface of the front section is moved toward an outer lateral surface of the central section 23. Likewise, the second living hinge 32 is bent to allow the front section to collapse to a position substantially adjacent the back section.

Figure 3:
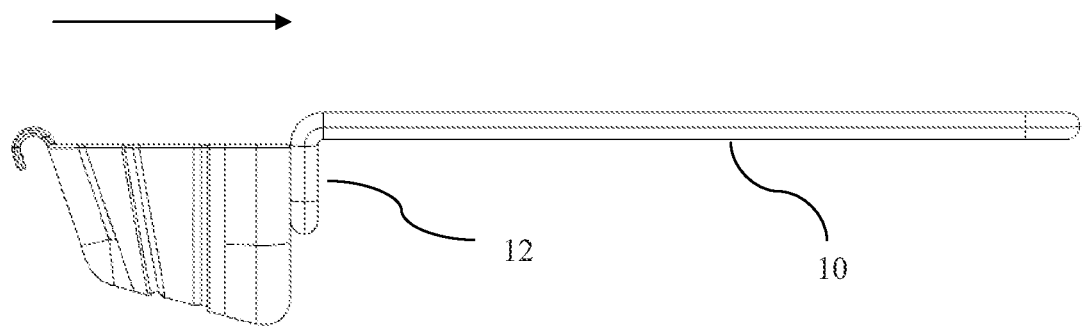
FIG. 3 is a side view of the version illustrated in FIG. 1, shown with the scrap bin expanded.
Figure 4:
FIG. 4 is a side view of the preferred version as illustrated in FIG. 3, shown with the scrap bin collapsed.

The scrap bin may also be collapsed when attached to the cutting board by pressing it inward in the direction of the arrow as illustrated in FIG. 3. After pressing it inward, the bin is collapsed as illustrated in FIG. 4.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A food preparation device, comprising:
   a cutting board having an upper surface and a lower surface, the upper surface being planar, the cutting board further having a first end and a second end; and
   a scrap bin removably attached to the first end of the cutting board, the scrap bin having an at least semi rigid front portion, an at least semi rigid back portion attached to the first end of the cutting board, and a collapsible intermediate portion secured between the front portion and the back portion, the scrap bin being formed such that the collapsible intermediate portion is configured to be more flexible than the front portion.

2. The food preparation device of claim 1, wherein the scrap bin is selectively movable between a collapsed position in which the front portion is relatively adjacent the back portion and an expanded position in which the front portion is relatively distant from the back portion, the scrap bin further being selectively movable between the collapsed and expanded positions while the scrap bin is secured to the cutting board.

3. The food preparation device of claim 2, wherein the collapsible intermediate portion is formed with a first living hinge adjacent the front portion and a second living hinge adjacent the back portion.

4. The food preparation device of claim 3, wherein the collapsible intermediate position portion is of substantially uniform thickness between the first living hinge and the second living hinge.

5. The food preparation device of claim 4, wherein the back portion is wider than the front portion.

6. The food preparation device of claim 5 further comprising a handle formed on the front portion.

7. The food preparation device of claim 5, wherein the cutting board further comprises a vertical face substantially orthogonal to the planar surface, the vertical face and planar surface forming an L-shape.

8. The food preparation device of claim 7, wherein the scrap bin is secured to the vertical face.

9. The food preparation device of claim 7, wherein the vertical face comprises a plurality of pins, the back portion being configured to be removably mounted on the pins.

10. The food preparation device of claim 9 wherein the back portion further comprises a plurality of flared cavities for receiving the plurality of pins.

11. The food preparation device of claim 7, wherein the vertical face further comprises a means for mounting the scrap bin to the cutting board.

12. The food preparation device of claim 7, wherein the front portion and the back portion are each substantially rigid.

13. A food preparation device, comprising:
    a cutting board having an upper surface and a lower surface, the upper surface being planar, the cutting board further having a vertical face extending downward from the such that a portion of the cutting board forms an L-shape; and
    a scrap bin having an at least semi rigid front portion, an at least semi rigid back portion, and an collapsible intermediate portion secured between the front portion and the back portion, the back portion being removably attached to the vertical face of the cutting board, wherein the front portion and intermediate portion of the scrap bin are supported by the back portion when the scrap bin is attached to the cutting board.

14. The food preparation device of claim 13 wherein the scrap bin is selectively movable between a collapsed position in which the front portion is relatively adjacent the back portion and an expanded position in which the front portion is relatively distant from the back portion.

15. The food preparation device of claim 14, wherein the intermediate portion is formed from a flexible material whereby the intermediate portion is folded in the collapsed position.

16. The food preparation device of claim 14, wherein the vertical face extends along an entire side of the cutting board.

17. The food preparation device of claim 13, wherein the front portion is formed from a rigid material and the intermediate portion is formed from a flexible material.

18. The food preparation device of claim 17, wherein the back portion is formed from a rigid material.

\* \* \* \* \*